US008856673B1

(12) United States Patent
Dorfmann et al.

(10) Patent No.: US 8,856,673 B1
(45) Date of Patent: Oct. 7, 2014

(54) FLIGHT PLANNING SYSTEM WITH BOOKMARKING

(75) Inventors: Cindy Dorfmann, Darmstadt (DE); Andreas Sindlinger, Weinheim (DE); Nima Barraci, Hessen (DE)

(73) Assignee: The Boeing Company, Chicago, IL (US)

( * ) Notice: Subject to any disclaimer, the term of this patent is extended or adjusted under 35 U.S.C. 154(b) by 468 days.

(21) Appl. No.: 13/074,413

(22) Filed: Mar. 29, 2011

(51) Int. Cl.
*G06F 3/048* (2013.01)

(52) U.S. Cl.
USPC .......... 715/771

(58) Field of Classification Search
USPC .......... 715/771, 856, 810
See application file for complete search history.

(56) References Cited

U.S. PATENT DOCUMENTS 5,334,982 A * 8/1994 Owen .......... 342/36
5,374,932 A * 12/1994 Wyschogrod et al. .......... 342/36
5,519,392 A * 5/1996 Oder et al. .......... 340/995.27
5,732,384 A * 3/1998 Ellert et al. .......... 701/120
6,020,831 A * 2/2000 Nishida et al. .......... 340/945
6,047,233 A * 4/2000 Salvatore et al. .......... 701/120
6,148,261 A * 11/2000 Obradovich et al. .......... 701/438
6,385,602 B1 * 5/2002 Tso et al. .......... 1/1
6,466,235 B1 * 10/2002 Smith et al. .......... 715/771
6,753,891 B1 * 6/2004 Chohan et al. .......... 715/790
6,867,711 B1 * 3/2005 Langner et al. .......... 340/979
6,868,525 B1 * 3/2005 Szabo .......... 715/738
6,961,731 B2 * 11/2005 Holbrook .......... 1/1
7,321,318 B2 * 1/2008 Crane et al. .......... 340/971
7,496,548 B1 * 2/2009 Ershov .......... 706/20
7,529,743 B1 * 5/2009 Ershov .......... 1/1
2006/0005147 A1 * 1/2006 Hammack et al. .......... 715/805
2011/0196881 A1 * 8/2011 Deleris et al. .......... 707/752

OTHER PUBLICATIONS

U.S. Appl. No. 12/850,855, filed Aug. 5, 2010, Clark et al.
U.S. Appl. No. 12/689,600, filed Jan. 19, 2010, Dorfmann.

* cited by examiner

*Primary Examiner* — Phenuel Salomon
(74) *Attorney, Agent, or Firm* — Yee & Associates, P.C.

(57) ABSTRACT

A method and apparatus for managing vehicle information. The vehicle information is displayed on a display system for a vehicle. The vehicle information is for operating the vehicle. An item in the vehicle information is placed in a group of items of interest in response to receiving a user input selecting the item from the vehicle information as an item of interest. A number of items in the group of items of interest is displayed in association with a number of graphical indicators on the display system. The number of graphical indicators identifies the number of items as a number of items of interest.

24 Claims, 11 Drawing Sheets

FLIGHT PLANNING SYSTEM WITH BOOKMARKING

BACKGROUND INFORMATION

1. Field:

The present disclosure relates generally to aircraft and, in particular, to a method and apparatus for managing information in an aircraft.

2. Background:

Computers are used in aircraft to display information for operating the aircraft. Examples of computers used on an aircraft include, for example, without limitation, a flight management system, an electronic flight bag, and other suitable types of computers. These computers present information on display systems for operating the aircraft.

Examples of display devices in the display systems include a navigation display device, a multifunction display device, and other suitable types of display devices. Information, such as maps, charts, weather information, notice to airmen (NOTAM), and other suitable information may be presented to operators of the aircraft using these display devices.

The different number of display devices and the large amounts of information that can be presented by the computers in an aircraft may increase an amount of concentration needed by operators of the aircraft to operate the aircraft. This situation may increase the time needed to perform different tasks and may require more crew members than desired to perform the tasks. Additionally, the number of times that an operator may need relief may occur more often than desired.

Therefore, it would be advantageous to have a method and apparatus that takes into account at least some of the issue discussed above, as well as possibly other issues.

SUMMARY

In one advantageous embodiment, a method is provided for managing flight information for an aircraft. Flight information for the aircraft is displayed in a first area on a display system for the aircraft. A map used to operate the aircraft is displayed in a second area on the display system. An item is placed in a group of items of interest in response to receiving a user input selecting the item from the flight information as an item of interest. A number of items in the group of items of interest is displayed in the first area of the display system in association with a number of graphical indicators in the first area. The number of graphical indicators identifies the number of items as a number of items of interest.

In another advantageous embodiment, a method is provided for managing vehicle information. The vehicle information is displayed on a display system for a vehicle. The vehicle information is for operating the vehicle. An item in the vehicle information is placed in a group of items of interest in response to receiving a user input selecting the item from the vehicle information as an item of interest. A number of items in the group of items of interest is displayed in association with a number of graphical indicators on the display system. The number of graphical indicators identifies the number of items as a number of items of interest.

In yet another advantageous embodiment, an apparatus comprises a display system for a vehicle and an information management module in communication with the display system. The information management module is configured to display vehicle information on the display system. The vehicle information is for operating the vehicle. The information management module is configured to place an item in the vehicle information in a group of items of interest in response to receiving a user input selecting the item from the vehicle information as an item of interest. The information management module is configured to display a number of items in the group of items of interest in association with a number of graphical indicators. The number of graphical indicators identifies the number of items as a number of items of interest.

In still yet another advantageous embodiment, a method is provided for managing flight information. A number of graphical indicators is displayed in association with a number of items of flight information on a display device. The number of items of flight information is associated with a number of locations on a map. In response to a user input selecting a graphical indicator in the number of graphical indicators, at least a portion of the map with a location in the number of locations is displayed on the display device. The location is associated with the graphical indicator.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

The different advantageous embodiments recognize a number of different considerations. For example, the different advantageous embodiments recognize and take into account that some information displayed on a display device may be information that does not currently need to be in the focus of an operator of an aircraft. For example, an area of information on the display device may provide weather information for a current flight of the aircraft. This weather information may identify weather conditions that the operator should take into account when the aircraft reaches a particular location at a particular time during the flight. If the aircraft is ahead of schedule or behind schedule, the weather information may not be relevant to the flight.

The different advantageous embodiments recognize and take into account that it would be desirable to identify information that is relevant to the flight. In this manner, the amount of time and/or concentration needed by an operator of a vehicle may be decreased.

Thus, the different advantageous embodiments provide a method and apparatus for managing vehicle information. In these illustrative examples, vehicle information is any information that may be used to operate a vehicle. In one advantageous embodiment, vehicle information is displayed on a display system for a vehicle. In response to receiving user input selecting an item in the vehicle information as an item of interest, the item is placed in a group of items of interest. The item is displayed in association with a graphical indicator on the display system. The graphical indicator identifies the item as an item of interest.

Figure 1:
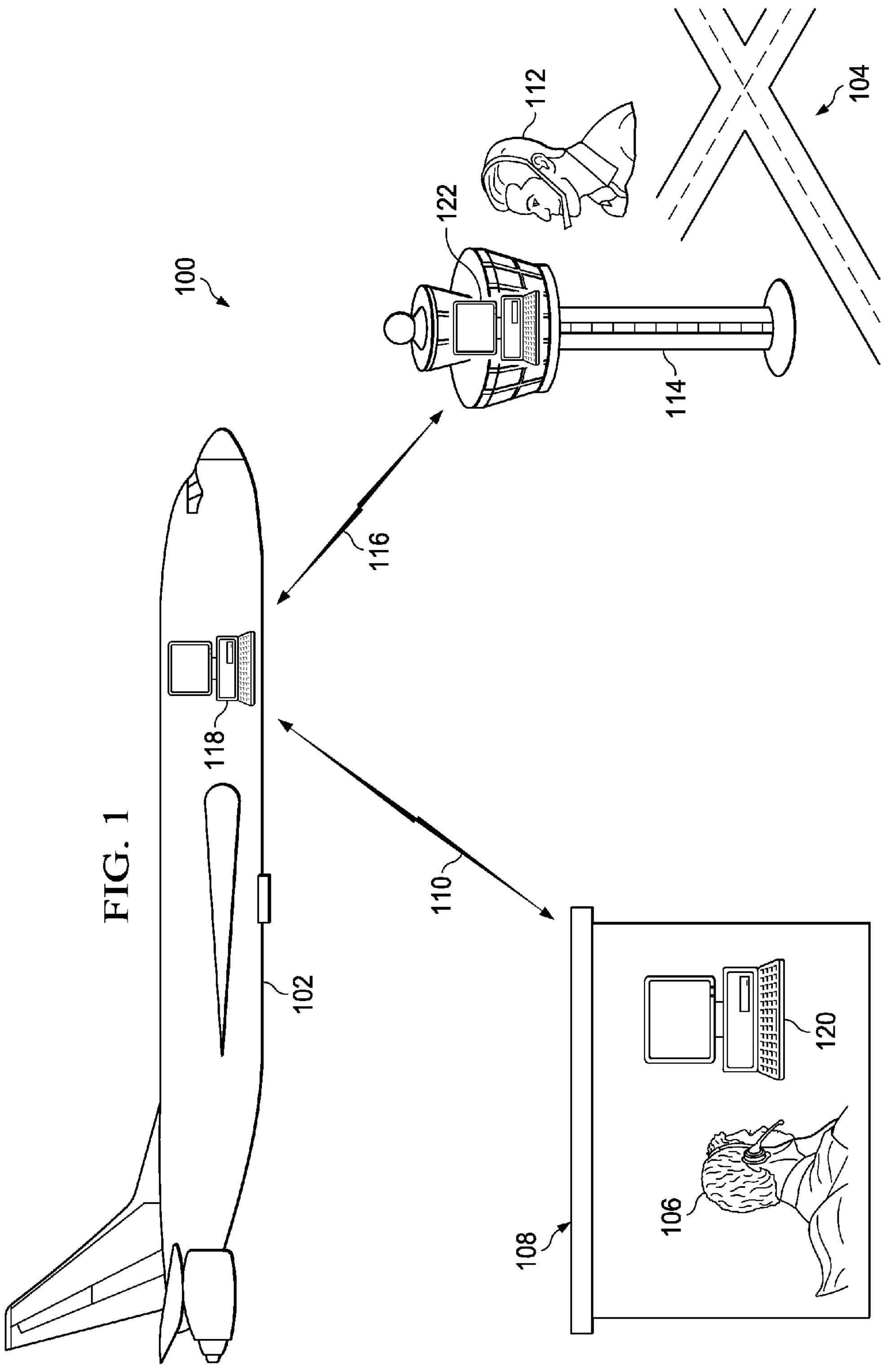
FIG. 1 is an illustration of an information management environment in accordance with an advantageous embodiment.

With reference now to the figures and, in particular, with reference to FIG. 1, an illustration of an information management environment is depicted in accordance with an advantageous embodiment. In this illustrative example, information management environment 100 includes aircraft 102, which is en route to airport 104.

Aircraft 102 may communicate with dispatcher 106 at airline facility 108. This communication may occur using wireless communications link 110. Additionally, aircraft 102 also may communicate with air traffic controller 112 in air traffic control tower 114. This communication occurs over wireless communications link 116.

The different advantageous embodiments may be implemented in at least one of computer system 118 in aircraft 102, computer system 120 in airline facility 108, and/or computer system 122 in air traffic control tower 114.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C, or item B and item C.

Figure 2:
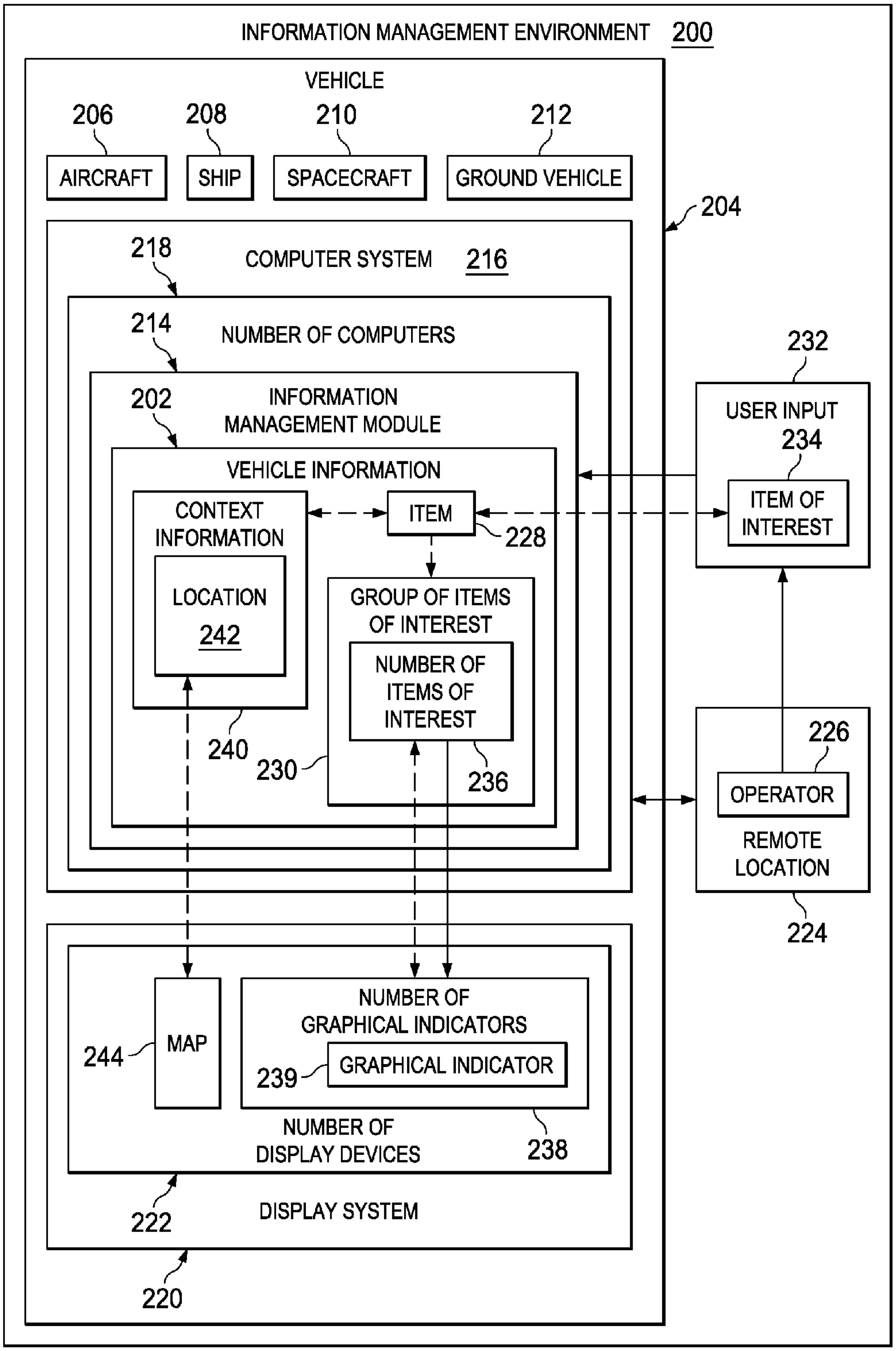
FIG. 2 is an illustration of an information management environment in accordance with an advantageous embodiment.

With reference now to FIG. 2, an illustration of an information management environment is depicted in accordance with an advantageous embodiment. Information management environment 100 in FIG. 1 is an example of one implementation for information management environment 200.

In this illustrative example, information management environment 200 is used to manage vehicle information 202 for vehicle 204. Vehicle 204 may take a number of different forms. For example, vehicle 204 may be selected from one of aircraft 206, ship 208, spacecraft 210, ground vehicle 212, and other suitable types of vehicles.

In these depicted examples, information management module 214 manages vehicle information 202. In these illustrative examples, information management module 214 may take the form of hardware, software, or a combination of the two. In some illustrative examples, information management module 214 may be part of computer system 216. Computer system 216 includes number of computers 218. As used herein, "a number of items" means one or more items. For example, "a number of computers" is one or more computers.

Information management module 214 displays vehicle information 202 on display system 220 in these illustrative examples. Display system 220 is hardware that is configured to display information. Additionally, display system 220 also may include software. In particular, vehicle information 202 is displayed on number of display devices 222 within display system 220.

In these illustrative examples, information management module 214 in computer system 216 and display system 220 are located in vehicle 204. In other illustrative examples, information management module 214 in computer system 216 may be located at remote location 224. Remote location 224 is a location other than vehicle 204 in these examples. Remote location 224 may be, for example, without limitation, at least one of an air traffic control tower, an airline facility, and some other suitable location in which vehicle information 202 may be displayed for use in operating vehicle 204. In some cases, computer system 216 may be portable such that information management module 214 may be used in different locations.

When operator 226 is at remote location 224, operator 226 may use information management module 214 to operate vehicle 204. In some cases, operator 226 may remotely operate vehicle 204. For example, operator 226 may remotely operate vehicle 204 when vehicle 204 takes the form of an unmanned vehicle.

In yet other illustrative examples, operator 226 may be a dispatcher, an air traffic controller, or some other suitable type of operator at remote location 224. In these types of examples, operator 226 may indirectly operate vehicle 204. As one illustrative example, operator 226 may provide instructions, such as, for example, without limitation, at least one of a runway to use for landing, a taxiway, an airport, an identification of radio frequencies for communications, and other suitable types of information.

In these illustrative examples, vehicle information 202 is displayed on display system 220 for vehicle 204. Item 228 in vehicle information 202 is placed in group of items of interest 230 in response to receiving user input 232 selecting item 228 from vehicle information 202 as item of interest 234.

Placing item 228 in group of items of interest 230 means that item 228 is made part of group of items of interest 230 or is associated with group of items of interest 230. Group of items of interest 230 is similar to a group of bookmarks in these illustrative examples. Item 228 may be placed in group of items of interest 230 in a number of different ways.

For example, without limitation, the placement may be made by placing an identification of item 228 in a list of items that are part of group of items of interest 230, storing item 228 in a selected portion of memory or storage for group of items of interest 230, adding a pointer to item 228 that points to group of items of interest 230, and/or any other mechanism that may be used to make item 228 part of group of items of interest 230.

Number of items of interest 236 in group of items of interest 230 is displayed on display system 220. Number of items of interest 236 is the number of items in group of items of interest 230 that are displayed on display system 220. For example, if group of items of interest 230 includes 15 items, only eight items may be displayed at a particular time. In that case, number of items of interest 236 is the eight items that are to be displayed as items of interest at the particular time.

In displaying number of items of interest 236 on display system 220, other items in vehicle information 202 not within group of items of interest 230 also may be displayed with number of items of interest 236. However, in some cases, only number of items of interest 236 is displayed and other items from vehicle information 202 remain undisplayed in display system 220. In other cases, the other items from vehicle information 202 may be displayed on display system 220 in a separate location or area from number of items of interest 236. In this manner, operator 226 may focus on number of items of interest 236, while operating vehicle 204.

In these illustrative examples, number of graphical indicators 238 is displayed in association with number of items of interest 236. A graphical indicator in number of graphical indicators 238 is considered to be displayed in association with an item in number of items of interest 236 when a viewer of the graphical indicator associates the graphical indicator with the item.

For example, item 228 may be one of number of items of interest 236 displayed on display system 220. Graphical indicator 239 in number of graphical indicators 238 may be displayed in association with item 228 on display system 220. Graphical indicator 239 may be, for example, displayed next to item 228 or displayed as part of item 228.

As one illustrative example, graphical indicator 239 may be an icon displayed next to or near item 228. When graphical indicator 239 is considered part of item 228, graphical indicator 239 may be, for example, without limitation, highlighting, a font type, a font size, a color, italics, underlining, and/or other suitable types of graphical indicators.

Additionally, in these illustrative examples, context information 240 may be associated with item 228 when item 228 is placed in group of items of interest 230. Context information 240 may be associated with item 228 by creating a relationship or connection between context information 240 and item 228. This relationship may be made using, for example, pointers, tables, entries in databases, linked lists, and/or other suitable mechanisms used to generated relationships or connections between information.

For example, context information 240 may be associated with item 228 by saving context information 240 with item 228 when placing item 228 in group of items of interest 230. In other illustrative examples, context information 240 may be associated with item 228 by adding a pointer to context information 240 that points to item 228. In some cases, a pointer may be added to item 228 to point to context information 240. Additionally, pointers may be added to both item 228 and context information 240 to point to each other.

Context information 240 may take a number of different forms. For example, context information 240 may include a period of time for which item 228 is valid, a phase of flight for item 228, a location on a map for item 228, and/or other suitable types of context information.

In some cases, context information 240 may include location 242 on map 244. Location 242 is part of context information 240 for item 228.

With location 242, a selection of item 228 when displayed on display system 220 may result in map 244 being displayed in a manner such that location 242 is present on map 244 on display system 220. In these illustrative examples, map 244 may be a moving map. In other words, map 244 may include an indication of the current location and/or orientation of vehicle 204 in a location on map 244 corresponding to the actual location for vehicle 204.

In this manner, context information 240 may include any information relating to item 228. In some cases, context information 240 may be referred to as metadata.

The illustration of information management environment 200 in FIG. 2 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some illustrative examples, vehicle information 202 may be for a number of additional vehicles in addition to vehicle 204. The management and the operation of multiple vehicles may occur in various situations. For example, operator 226 may be a dispatcher or flight traffic controller providing user input 232 to control the multiple vehicles.

In other illustrative examples, operator 226 may use information management module 214 from within vehicle 204. For example, when vehicle 204 is aircraft 206, operator 226 may be a pilot or crew member for aircraft 206.

In some illustrative examples, information management module 214 may be located in a remote location from display system 220.

Figure 3:
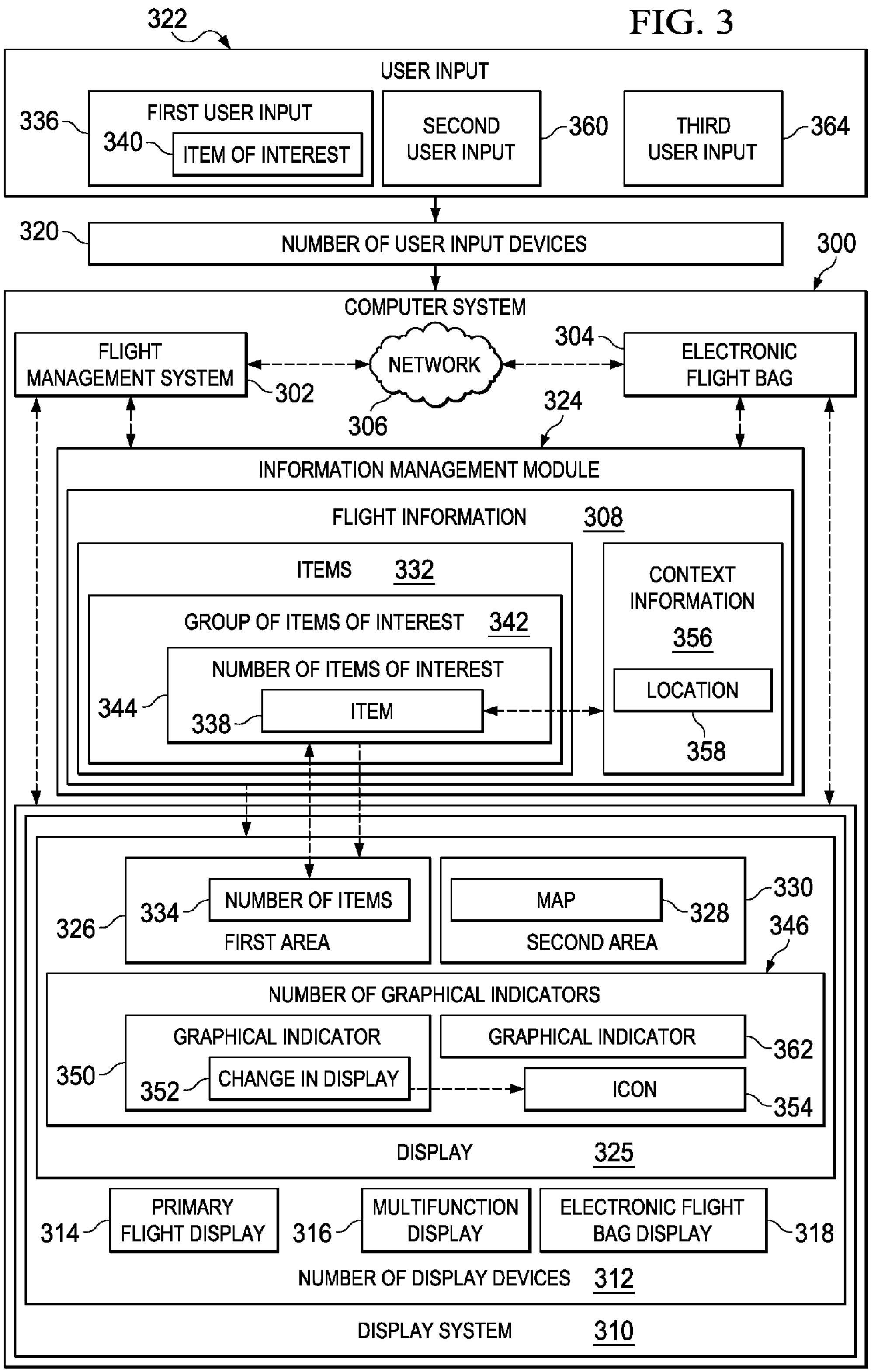
FIG. 3 is an illustration of a computer system for managing flight information in accordance with an advantageous embodiment.

With reference now to FIG. 3, an illustration of a computer system for managing flight information is depicted in accordance with an advantageous embodiment. In this illustrative example, computer system 300 is an example of one implementation for computer system 216 in FIG. 2. In this illustrative example, computer system 300 is for vehicle 204 in the form of aircraft 206 in FIG. 2.

As illustrated, computer system 300 includes flight management system 302 and electronic flight bag 304. Flight management system 302 is a number of computers within computer system 300.

Flight management system 302 is used to aid operators of aircraft 206 during flight of aircraft 206 in FIG. 2. Flight management system 302 provides information, such as maps, charts, headings, locations, flight plans, and/or other suitable types of information used to operate aircraft 206.

As illustrated, electronic flight bag 304 is a hardware device that aids operators of aircraft 206 in FIG. 2 in performing flight management tasks with less paper. For example, electronic flight bag 304 may include an aircraft operating manual, a flight crew operating manual, navigational charts, a moving map, applications for performing various calculations, and/or other suitable types of functions. In these illustrative examples, flight management system 302 and electronic flight bag 304 communicate with each other using network 306 in computer system 300.

Flight information 308 is displayed to an operator of computer system 300 through display system 310. Display system 310 is a hardware system in these illustrative examples. However, software also may be present within display system 310.

In these depicted examples, display system 310 is connected to flight management system 302 and electronic flight bag 304. Display system 310 may be directly connected to these components or may be connected through network 306. In some illustrative examples, display system 310 may be integrated or may be part of flight management system 302 and/or electronic flight bag 304.

In these illustrative examples, display system 310 includes number of display devices 312. Number of display devices 312 includes primary fight display 314, multifunction display 316, and electronic flight bag display 318. Primary flight display 314 may display information, such as altitude, attitude, pitch, roll, orientation with respect to horizon, angle of attack, airspeed, and/or other suitable types of information.

Multifunction display 316 displays information, such as navigation routes, moving maps, weather radar, airport information, and/or other suitable types of information. For example, multifunction display 316 may display flight information 308.

Electronic flight bag display 318 also may display information similar to that displayed by multifunction display 316. Additionally, electronic flight bag display 318 may display information, such as free flight procedures, checklists, charts, aircraft operating manuals, flight crew operating manuals, and/or other suitable types of information. In these illustrative examples, any of these displays may display flight information 308.

Number of user input devices 320 is connected to or part of computer system 300. In these illustrative examples, number of user input devices 320 may take a number of different forms. For example, without limitation, number of user input devices 320 may be at least one of a button, a touch screen, a mouse, a keyboard, and/or some other suitable type of user input device.

Number of user input devices 320 is configured to receive user input 322 from an operator, such as user input 232 from operator 226 in FIG. 2. User input 322 may take various forms. For example, without limitation, user input 322 may include a selection of a button, text, a selection of a location on a map, a command, and/or other suitable types of user input.

In this illustrative example, computer system 300 includes information management module 324. Information management module 324 may be software, hardware, or a combination of the two. Information management module 324 may be connected to or running on at least one of flight management system 302 and/or electronic flight bag 304 in these illustrative examples.

In these illustrative examples, information management module 324 generates display 325. In these examples, display 325 is a graphical user interface. Information management module 324 displays flight information 308 in first area 326 in display 325. Map 328 is displayed in second area 330 in display 325. Map 328 may be a chart, a moving map, or some other suitable type of map.

In these illustrative examples, a portion or all of map 328 may be displayed in second area 330. Depending on the level of detail, only a portion of map 328 may be displayed. When map 328 takes the form of a moving map, an indication or an identification of the location and direction of travel of the aircraft also may be displayed with respect to its location corresponding to the location on the map.

First area 326 and second area 330 in display 325 may be displayed on the same display device or a different display device within number of display devices 312 in display system 310. In other words, display 325 may be located on one or more of display devices in number of display devices 312, depending on the particular implementation.

In these illustrative examples, flight information 308 comprises items 332. Each item is an item of information within flight information 308. An item within items 332 may be, for example, without limitation, a notice to airmen, a route, a radio frequency, a waypoint, weather information, and/or some other suitable item of information that may be used to operate the aircraft.

In addition, the number of items in items 332 may be such that only a portion of items 332 is displayed in first area 326. As a result, number of items of interest 344 in items 332 is displayed. Number of items of interest 344 may be a portion or all of items 332. Other items in items 332 may be displayed or seen using user input 322 to scroll or change what items within items 332 are displayed in first area 326.

In these illustrative examples, some of items 332 may not be relevant or useful in operating the aircraft during the flight at a given point in time. Operating conditions, weather conditions, and/or other conditions may make one or more of items 332 not currently relevant for the particular flight.

An operator may enter first user input 336 in user input 322 through number of user input devices 320. First user input 336, in this example, selects item 338 from items 332 in flight information 308 as item of interest 340.

In response to first user input 336, information management module 324 places item 338 in group of items of interest 342. Group of items of interest 342 is one or more items within items 332 in flight information 308 that the operator desires to use or see, as compared to other items in items 332 that are not part of group of items of interest 342.

In these illustrative examples, number of items of interest 344 in group of items of interest 342 is displayed in first area 326 in display system 310. In other words, number of items of interest 344 is number of items 334 displayed on display system 310. Number of items of interest 344 may be a portion or all of group of items of interest 342. In some cases, number of items of interest 344 is a portion of group of items of interest 342 based on the manner in which information is displayed in first area 326.

As depicted, number of items of interest 344 is displayed in display system 310 with number of graphical indicators 346. Number of graphical indicators 346 identifies number of items of interest 344 as a number of items of interest to the operator viewing display system 310.

In these depicted examples, number of graphical indicators 346 may take a number of different forms. For example, number of graphical indicators 346 may include, for example, at least one of displaying an icon, changing a color of a current icon, changing a color of text or an item, displaying text in bold, changing an intensity at which an icon is displayed, changing the icon displayed in association with the item from one type of icon to another type of icon, and other suitable types of indicators. In this illustrative example, graphical indicator 350 in number of graphical indicators 346 takes the form of change in display 352 of icon 354.

In some illustrative examples, only number of items of interest 344 in group of items of interest 342 is displayed in first area 326. In other illustrative examples, number of items of interest 344 in group of items of interest 342 may be displayed with other items in items 332 in first area 326. In this manner, number of items 334 displayed in first area 326 may include number of items of interest 344 and other items not in group of items of interest 342. In some cases, these other items may be displayed in first area 326 without corresponding graphical indicators.

The selection of item 338 as item of interest 340 also may include associating other information with item 338 in group of items of interest 342. For example, context information 356 also may be associated with item 338 in group of items of interest 342. In these illustrative examples, context information 356 may include, for example, without limitation, a period of time for item 338 when item 338 is valid, a phase of flight for item 338, a location on map 328 for item 338, and other suitable types of information.

When context information 356 includes location 358, second user input 360 in user input 322 may be used to select item 338. When item 338 is selected, map 328 is displayed in second area 330 in a manner such that location 358 is present or visible in second area 330. Additionally, location 358 may be identified using graphical indicator 362.

In these illustrative examples, item 338 may be selected during the current phase of flight or location on a route. In addition, an operator may view future periods of time or locations that the aircraft will reach during the flight. By looking at those future periods of time, number of items of interest 344 displayed in first area 326 and the portion of map 328 displayed in second area 330 may change. In other words, number of items 334 displayed in display system 310 includes number of items of interest 344 in group of items of interest 342 that is present for the particular point in time of a flight along its route.

In some illustrative examples, third user input 364 in user input 322 may be used to remove items, such as item 338 from group of items of interest 342. In this manner, information management module 324 provides a method and apparatus for managing flight information 308.

Further, with information management module 324, an operator is provided a capability to customize or selectively configure what items in items 332 in flight information 308 are displayed. As a result, most information in flight information 308 may be displayed or made easier to find or see by an operator. These and other features provided by information management module 324 may reduce the effort and/or concentration needed by an operator to operate a vehicle, such as an aircraft.

The illustration of computer system 300 in FIG. 3 is not meant to imply physical or architectural limitations to the manner in which different computer systems may be implemented. In these illustrative examples, computer system 300 is a computer system for a vehicle in the form of an aircraft. Of course, computer system 300 may be used in other types of vehicles, such as ship 208 in FIG. 2, spacecraft 210 in FIG. 2, ground vehicle 212 in FIG. 2, and/or other suitable types of vehicles.

Further, in other implementations in illustrative examples, computer system 300 may take the form of a computer system in a location remote to the vehicle being operated. The computer system may be located at an air traffic control tower, an airline facility, and/or some other suitable location. With this type of implementation, the operation of the aircraft is indirect with the operators providing instructions, directions, and/or other suitable information to operate the aircraft.

With reference now to FIGS. 4-8, illustrations of displays for managing flight information are depicted in accordance with an advantageous embodiment. In these illustrative examples, a display from a computer system and changes to the display are presented to illustrate one manner in which flight information may be managed.

Figure 4:
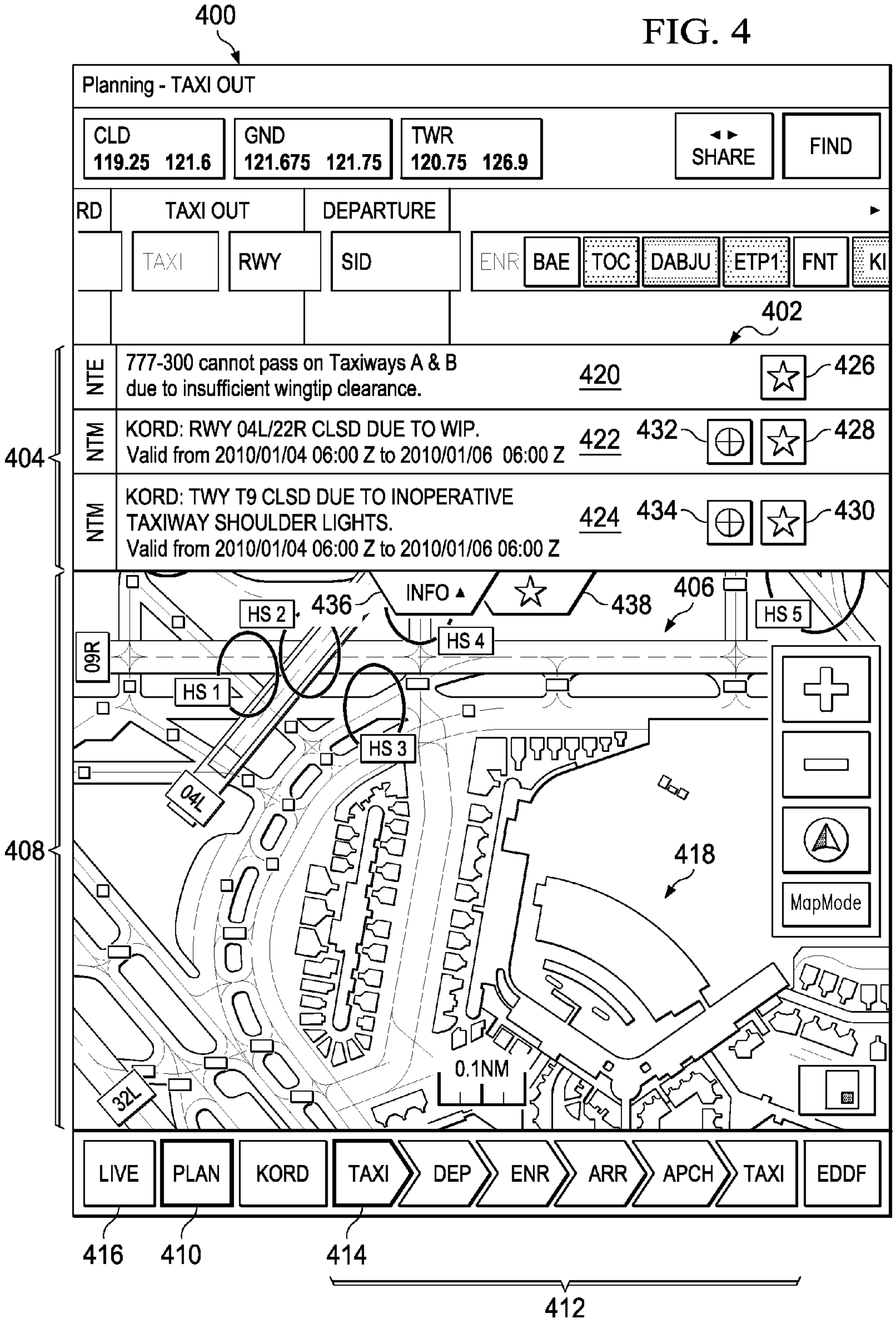
FIG. 4 is an illustration of a display on a computer system of an aircraft in accordance with an advantageous embodiment.

In FIG. 4, an illustration of a display on a computer system of an aircraft is depicted in accordance with an advantageous embodiment. In this illustrative example, display 400 is an example of one implementation for display 325 in FIG. 3. For example, display 400 may be presented by information management module 324 on a display device in number of display devices 312 in display system 310 in FIG. 3.

In this illustrative example, flight information 402 is displayed in first area 404 of display 400. Map 406 is presented in second area 408 of display 400. In this illustrative example, display 400 is presented in a planning mode, as indicated by the selection of plan control 410. In this mode, an operator may see flight information 402 for different phases of flight in phases of flight 412.

As illustrated, taxi phase 414 in phases of flight 412 is the phase currently being displayed on display 400. Taxi 414 is a taxi out phase of flight in this depicted example. Of course, when live control 416 is selected, the current phase of flight for the aircraft is displayed as the current phase of flight occurs.

In this illustrative example, airport 418 is displayed on map 406. In this illustrative example, flight information 402, which is displayed on display 400, includes item 420, item 422, and item 424. Item 420 indicates that aircraft of certain types cannot pass on taxiways A and B. Item 422 indicates that a runway is closed. Item 424 indicates that a taxiway is closed. Of course, other items may be present in flight information 402 that are relevant to taxi phase 414 but not displayed in this view.

In this illustrative example, star icon 426 is displayed in association with item 420, star icon 428 is displayed in association with item 422, and star icon 430 is displayed in association with item 424. User input may be entered to select one of these star icons to make the item associated or corresponding to the star icon part of a group of items of interest.

As depicted, location icon 432 is displayed in association with item 422, and location icon 434 is displayed in association with item 424 in these examples. A selection of one of these location icons causes the location that is for the particular item to be displayed on map 406 in second area 408. In addition, an indicator also may be displayed to identify the item at a location on map 406 corresponding to the location for the particular item.

In this illustrative example, the information displayed in first area 404 may be controlled through the selection of tab 436 and tab 438. In this example, tab 436 is currently selected. Tab 436 is an information tab in which all items in flight information 402 are displayed in first area 404. Selection of tab 438 provides a user an ability to control what items are displayed in first area 404 after items of interest have been identified. Tab 438 provides a display for a group of items of interest that have been selected by the operator.

Figure 5:
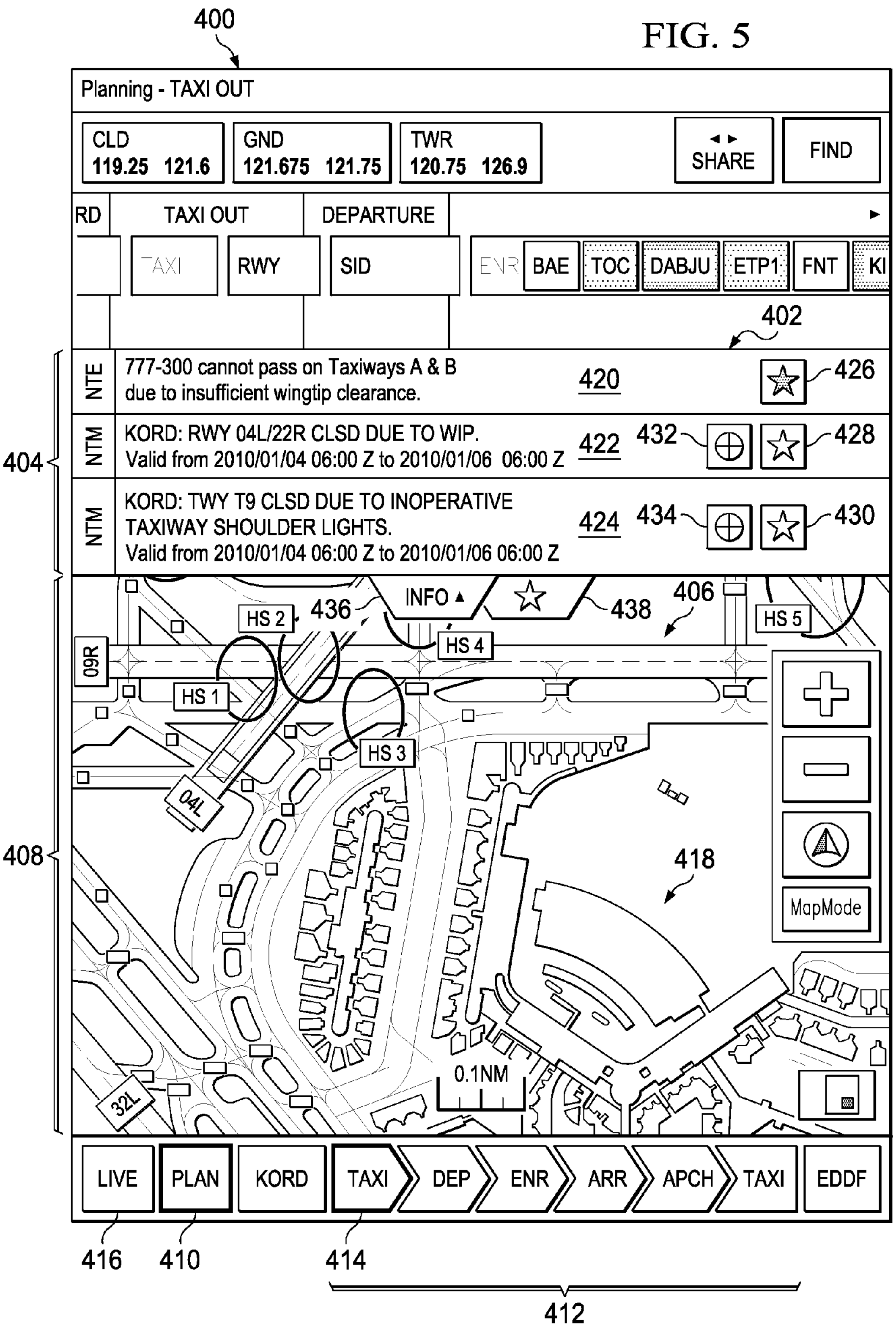
FIG. 5 is an illustration of a display in which an item has been selected as an item of interest in accordance with an advantageous embodiment.

With reference now to FIG. 5, an illustration of a display in which an item has been selected as an item of interest is depicted in accordance with an advantageous embodiment. In this example, item 420 in first area 404 of display 400 has been selected as an item of interest. As can be seen, star icon 426 now has a change in color. This change in color is a graphical indicator that item 420 is an item of interest. This change in color is in contrast to the current display of star icon 428 for item 422 and star icon 430 for item 424 in first area 404 on display 400.

Figure 6:
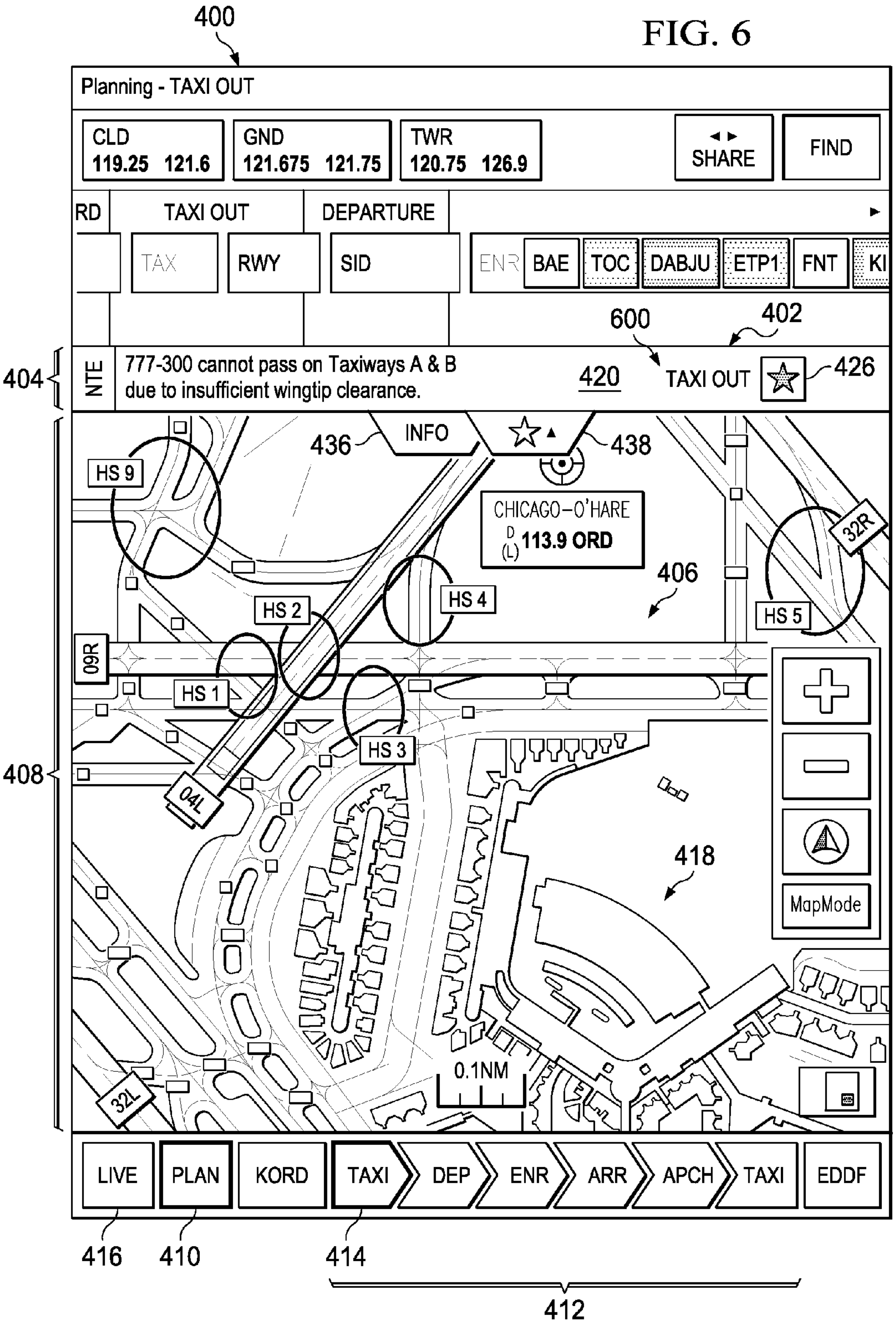
FIG. 6 is an illustration of a display of items of interest in accordance with an advantageous embodiment.

With reference now to FIG. 6, an illustration of a display of items of interest is depicted in accordance with an advantageous embodiment. In FIG. 6, tab 438 has been selected.

In this example, display 400 has changed such that only items that have been selected as items of interest are displayed in first area 404. As can be seen, item 420 remains in first area 404, while item 422 and item 424 are no longer displayed in first area 404. In this manner, fewer items may be displayed and less information is present for an operator to review or filter through.

Further, when tab 438 is selected, the items of interest that are displayed in first area 404 may include an indication of the phase of flight for which the item of interest is relevant. For example, as depicted, indication 600 is associated with item 420 in first area 404. Indication 600 is an indication that item 420 is relevant for a taxi out phase of flight.

Figure 7:
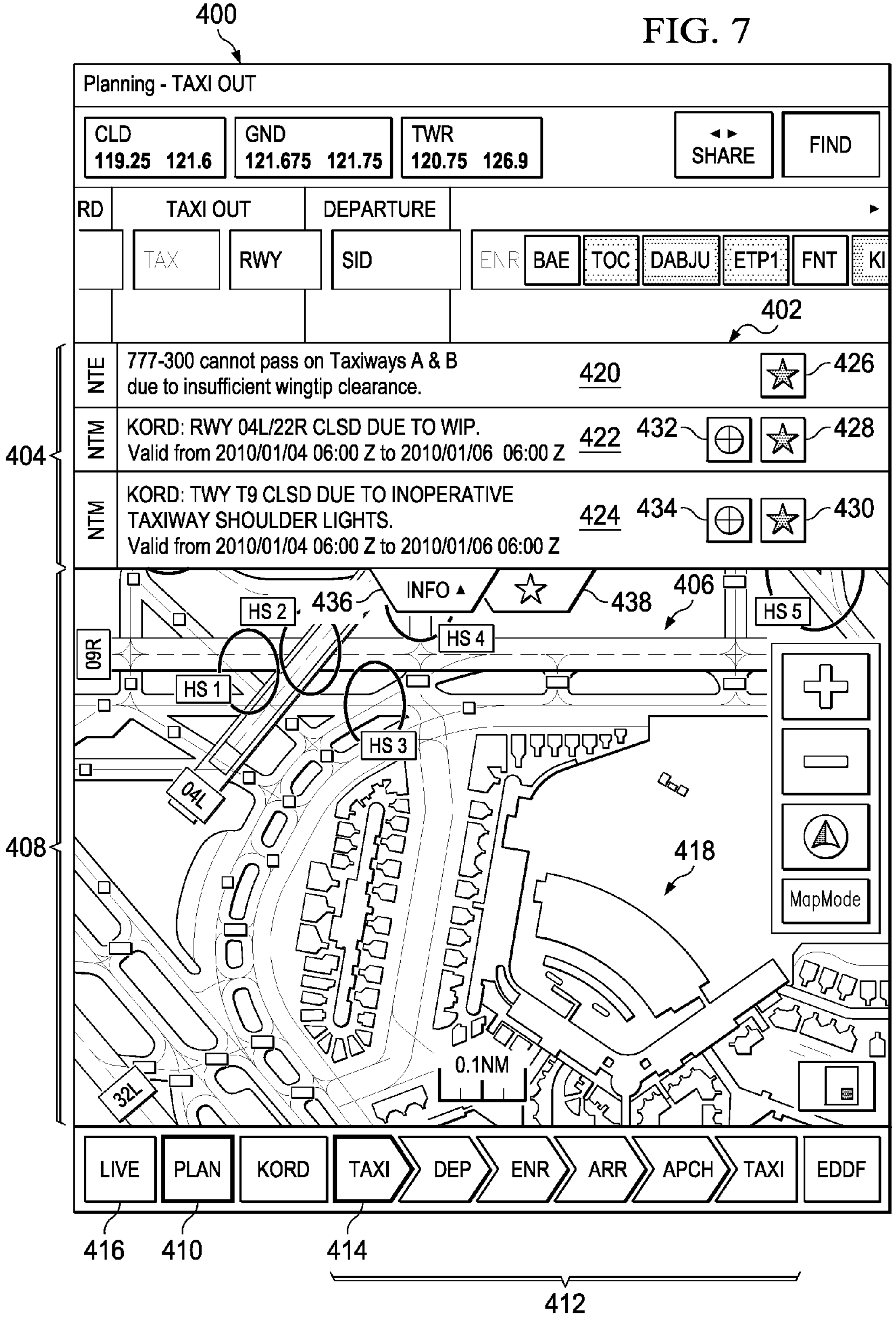
FIG. 7 is an illustration of a display with items of interest in accordance with an advantageous embodiment.

With reference now to FIG. 7, an illustration of a display with items of interest is depicted in accordance with an advantageous embodiment. In this example, tab 436 is selected. Display 400 displays item 420, item 422, and item 424. Star icon 426, star icon 428, and star icon 430 that are associated with these items have a change in color indicating that all three of these items are items of interest.

Figure 8:
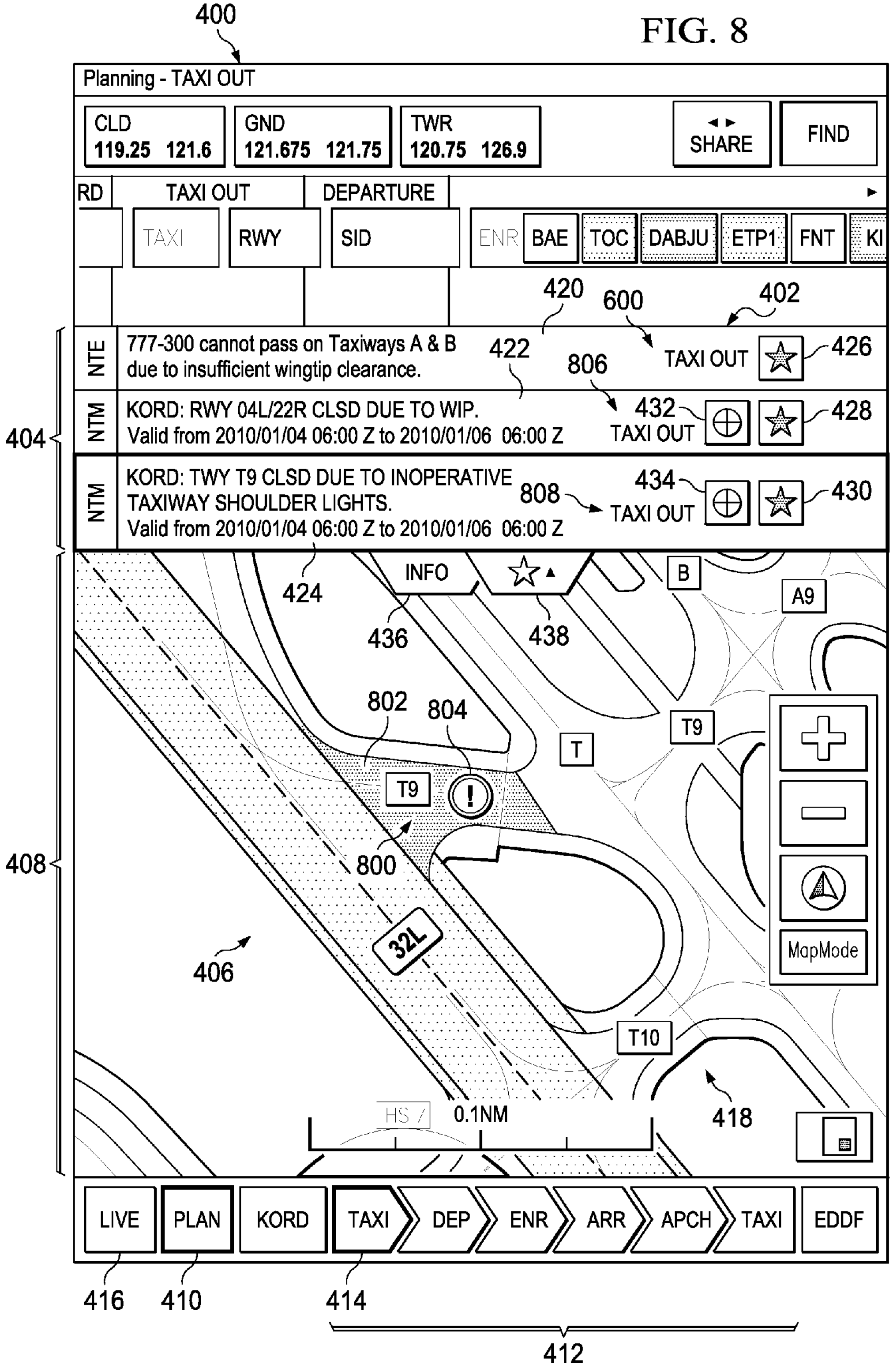
FIG. 8 is an illustration of a selection of an item in accordance with an advantageous embodiment.

In FIG. 8, an illustration of a selection of an item is depicted in accordance with an advantageous embodiment. In this illustrative example, tab 438 is selected. As depicted, items of interest are displayed in first area 404 on display 400. Item 420, item 422, and item 424 are displayed in first area 404 based on the selection of star icon 426, star icon 428, and star icon 430, respectively, in display 400.

Further, as depicted, indication 600 is associated with item 420, indication 806 is associated with item 422, and indication 808 is associated with item 424. Indication 806 and indication 808 are indications that item 422 and item 424, respectively, are relevant to a taxi out phase of flight.

Additionally, in this illustrative example, item 424 has been selected as one in which more information is desired. For example, location icon 434 has been selected through user input. Selection of location icon 434 changes the display of map 406 such that location 800 associated with item 424 is shown in an enlarged or zoomed fashion. In other words, selection of location icon 434 for item 424 results in location 800 being displayed in a more prominent zoomed fashion.

Further, a selection of item 424 causes taxi phase 414 to be selected in phases of flight 412, because indication 808 indicates that item 424 is relevant to a taxi out phase of flight. In other examples, a selection of some other type of item with an indication of relevance to a different phase of flight may cause that particular phase of flight to be selected in phases of flight 412.

Location 800 is for taxiway 802, which is the subject of the information in item 424. Graphical indicator 804 is also displayed at location 800. Graphical indicator 804 provides an ability to draw the attention of the operator to location 800 for the selected item, which is item 424.

Further, as depicted, item 424 is highlighted in first area 404, as compared to item 420 and item 422. This highlighting indicates that the location that is displayed on map 406 is for item 424.

Although these items are illustrated as ones being in a group of items of interest, the different illustrative examples may be applied to the selection of items that are not items of interest.

The illustration of the displays in FIGS. 4-8 are only meant to provide illustrations of one manner in which a display may be presented. These illustrations are not meant to limit the manner in which other displays may be generated or displayed for use. For example, in other illustrative examples, first area 404 and second area 408 may be presented on different displays rather than on the same display on a single display device. In other illustrative examples, the number of items that may be displayed or the manner in which they are displayed also may differ.

Figure 9:
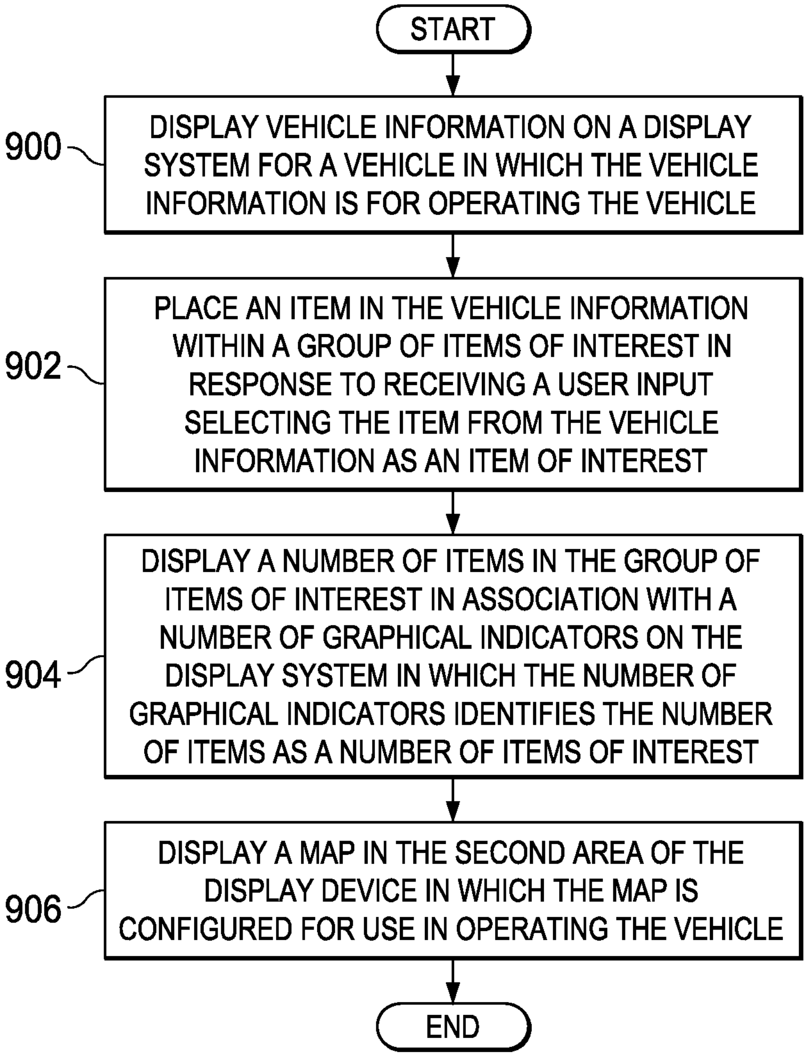
FIG. 9 is an illustration of a flowchart of a process for managing vehicle information in accordance with an advantageous embodiment.

With reference now to FIG. 9, an illustration of a flowchart of a process for managing vehicle information is depicted in accordance with an advantageous embodiment. The process illustrated in FIG. 9 may be implemented in computer system 300 in FIG. 3. In particular, the different operations in FIG. 9 may be implemented in information management module 324 in FIG. 3.

The process begins by displaying vehicle information on a display system for a vehicle in which the vehicle information is for operating the vehicle (operation 900). An item in the vehicle information is placed in a group of items of interest in response to receiving a user input selecting the item from the vehicle information as an item of interest (operation 902).

A number of items in the group of items of interest is displayed in association with a number of graphical indicators on the display system in which the number of graphical indicators identifies the number of items as a number of items of interest (operation 904). In operation 904, these items may be displayed in a first area in the display system. A map is displayed in the second area of the display device in which the map is configured for use in operating the vehicle (operation 906), with the process terminating thereafter.

Figure 10:
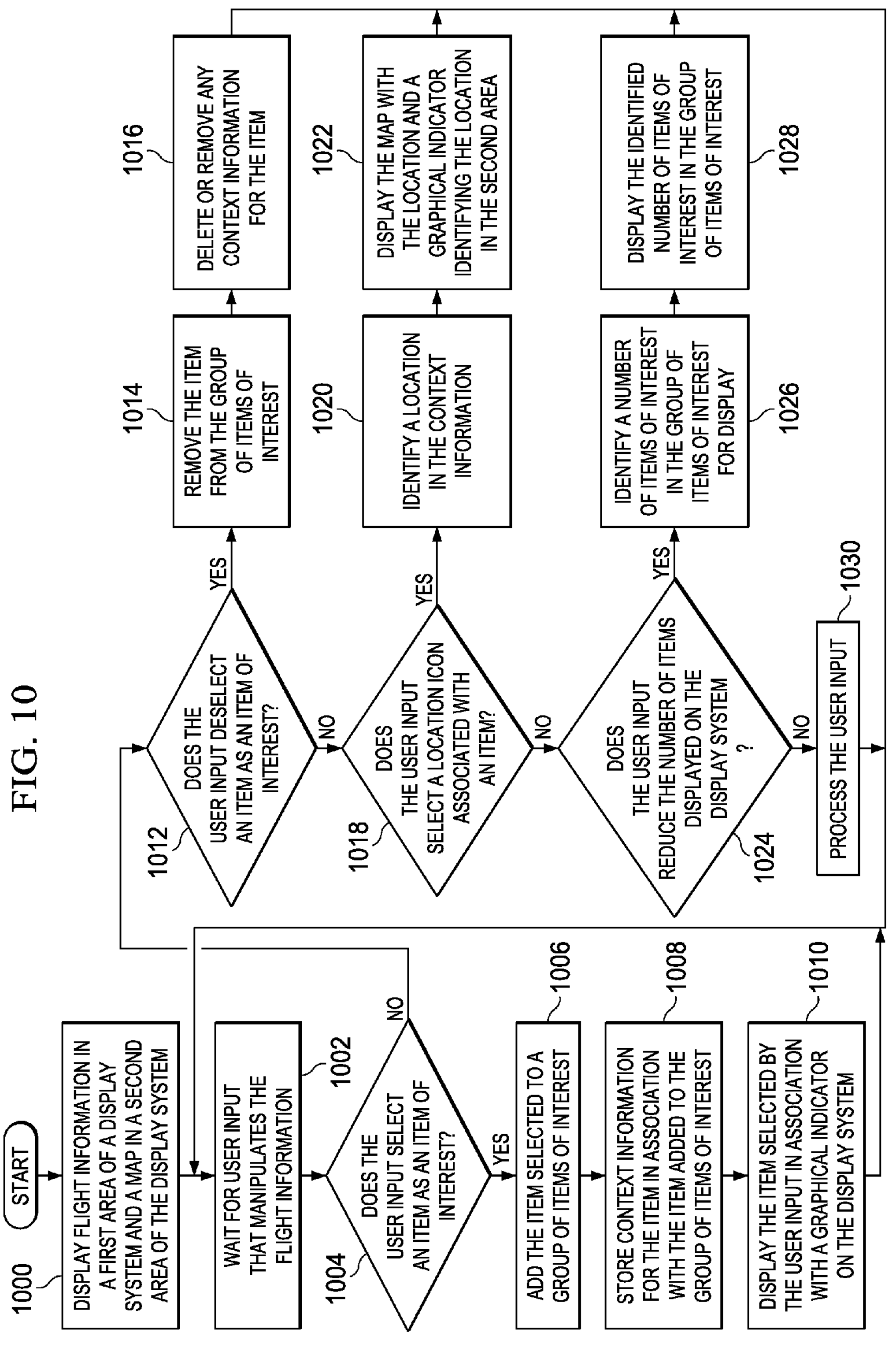
FIG. 10 is an illustration of a flowchart of a process for displaying flight information for an aircraft in accordance with an advantageous embodiment.

With reference now to FIG. 10, an illustration of a flowchart of a process for displaying flight information for an aircraft is depicted in accordance with an advantageous embodiment. The process illustrated in FIG. 10 may be implemented in computer system 300 in FIG. 3. In particular, this process may be implemented in information management module 324 in FIG. 3.

The process begins by displaying flight information in a first area of a display system and a map in a second area of the display system (operation 1000). The process then waits for user input that manipulates the flight information (operation 1002). Upon receiving the user input, a determination is made as to whether the user input selects an item as an item of interest (operation 1004).

If the user input selects an item as an item of interest, the process adds the item selected to a group of items of interest (operation 1006). The process also stores context information for the item in association with the item added to the group of items of interest (operation 1008). This context information may include, for example, a location, a time, and a phase of flight for the item.

The process displays the item selected by the user input in association with a graphical indicator on the display system (operation 1010). The graphical indicator, in these examples, is a change in color of a star icon that is displayed in association with the item. The process then returns to operation 1002.

With reference again to operation 1004, if the user input does not select an item as an item of interest, a determination is made as to whether the user input deselects an item as an item of interest (operation 1012).

If the user input deselects an item as an item of interest, the item is removed from the group of items of interest (operation 1014). Any context information associated with the item also is removed or deleted (operation 1016). The process then returns to operation 1002 as described above.

With reference again to operation 1012, if the user input does not deselect the item as an item of interest, the process determines whether the user input selects a location icon associated with an item (operation 1018).

If the user input selects a location icon associated with an item, the process identifies a location in the context information for the item (operation 1020). Thereafter, the process displays the map with the location and a graphical indicator identifying the location in the second area (operation 1022). In operation 1022, the process may magnify or zoom the map with respect to the location. The location may be centered, depending on the particular implementation. The process then returns to operation 1002.

With reference again to operation 1018, if the user input does not select a location icon, a determination is made as to whether the user input reduces a total number of items displayed on the display system (operation 1024). If the user input reduces the number of items displayed, the process identifies a number of items of interest in the group of items of interest for display (operation 1026). The identification of items in the group of items of interest is made to take into account how many items may be displayed in the first area based on the user input. As a result, only some items in the group of items of interest may be identified.

The process then displays the identified number of items of interest in the group of items of interest (operation 1028). The process then returns to operation 1002 as described above.

With reference again to operation 1024, if the user input does not reduce the number of items displayed, the user input is processed (operation 1030), with the process then returning to operation 1002. In operation 1030, processing the user input may include moving a cursor, highlighting information, and/or performing other suitable operations based on the user input.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Figure 11:
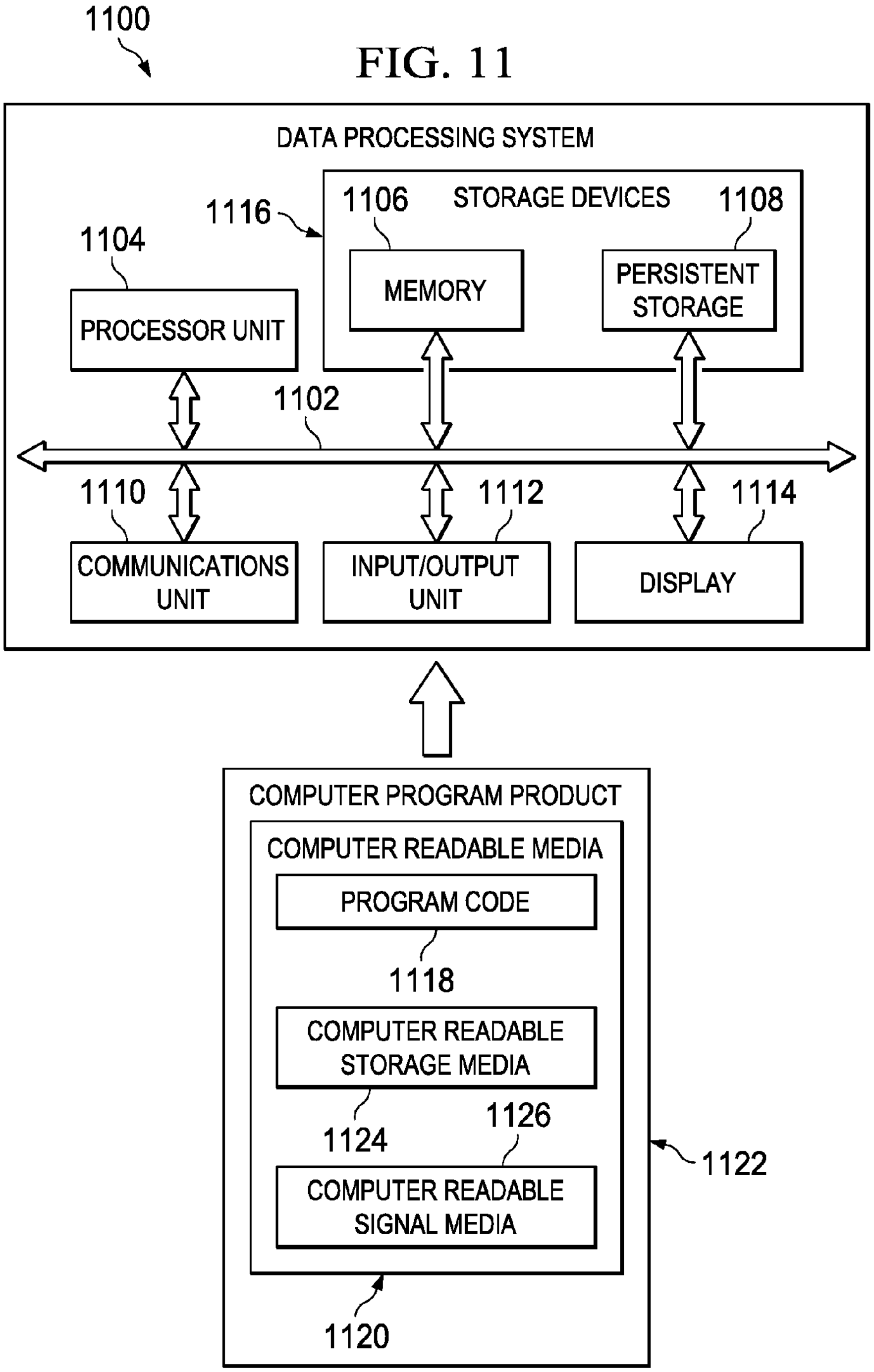
FIG. 11 is an illustration of a data processing system in accordance with an advantageous embodiment.

Turning now to FIG. 11, an illustration of a data processing system is depicted in accordance with an advantageous embodiment. In this illustrative example, data processing system 1100 includes communications fabric 1102, which provides communications between processor unit 1104, memory 1106, persistent storage 1108, communications unit 1110, input/output (I/O) unit 1112, and display 1114.

Data processing system 1100 is an example of one implementation for computers and other data processing systems in the different illustrative examples. For example, data processing system 1100 may be used to implement computer system 118, computer system 120, and/or computer system 122 in FIG. 1. As another example, data processing system 1100 may be used to implement one or more of number of computers 218 in computer system 216 in information management environment 200 in FIG. 2. Further, data processing 1100 also may be used to implement flight management system 302 and/or electronic flight bag 304 in computer system 300 in FIG. 3.

Processor unit 1104 serves to execute instructions for software that may be loaded into memory 1106. Processor unit 1104 may be a number of processors, a multi-processor core, or some other type of processor, depending on the particular implementation. A number, as used herein with reference to an item, means one or more items. Further, processor unit 1104 may be implemented using a number of heterogeneous processor systems in which a main processor is present with secondary processors on a single chip. As another illustrative example, processor unit 1104 may be a symmetric multi-processor system containing multiple processors of the same type.

Memory 1106 and persistent storage 1108 are examples of storage devices 1116. A storage device is any piece of hardware that is capable of storing information, such as, for example, without limitation, data, program code in functional form, and/or other suitable information either on a temporary basis and/or a permanent basis. Storage devices 1116 may also be referred to as computer readable storage devices in these examples. Memory 1106, in these examples, may be, for example, a random access memory or any other suitable volatile or non-volatile storage device. Persistent storage 1108 may take various forms, depending on the particular implementation.

For example, persistent storage 1108 may contain one or more components or devices. For example, persistent storage 1108 may be a hard drive, a flash memory, a rewritable optical disk, a rewritable magnetic tape, or some combination of the above. The media used by persistent storage 1108 also may be removable. For example, a removable hard drive may be used for persistent storage 1108.

Communications unit 1110, in these examples, provides for communications with other data processing systems or devices. In these examples, communications unit 1110 is a network interface card. Communications unit 1110 may provide communications through the use of either or both physical and wireless communications links.

Input/output unit 1112 allows for input and output of data with other devices that may be connected to data processing system 1100. For example, input/output unit 1112 may provide a connection for user input through a keyboard, a mouse, and/or some other suitable input device. Further, input/output unit 1112 may send output to a printer. Display 1114 provides a mechanism to display information to a user.

Instructions for the operating system, applications, and/or programs may be located in storage devices 1116, which are in communication with processor unit 1104 through communications fabric 1102. In these illustrative examples, the instructions are in a functional form on persistent storage 1108. These instructions may be loaded into memory 1106 for execution by processor unit 1104. The processes of the different embodiments may be performed by processor unit 1104 using computer-implemented instructions, which may be located in a memory, such as memory 1106.

These instructions are referred to as program code, computer usable program code, or computer readable program code that may be read and executed by a processor in processor unit 1104. The program code in the different embodiments may be embodied on different physical or computer readable storage media, such as memory 1106 or persistent storage 1108.

Program code 1118 is located in a functional form on computer readable media 1120 that is selectively removable and may be loaded onto or transferred to data processing system 1100 for execution by processor unit 1104. Program code 1118 and computer readable media 1120 form computer program product 1122 in these examples. In one example, computer readable media 1120 may be computer readable storage media 1124 or computer readable signal media 1126. Computer readable storage media 1124 may include, for example, an optical or magnetic disk that is inserted or placed into a drive or other device that is part of persistent storage 1108 for transfer onto a storage device, such as a hard drive, that is part of persistent storage 1108.

Computer readable storage media 1124 also may take the form of a persistent storage, such as a hard drive, a thumb drive, or a flash memory, that is connected to data processing system 1100. In some instances, computer readable storage media 1124 may not be removable from data processing system 1100. In these examples, computer readable storage media 1124 is a physical or tangible storage device used to store program code 1118 rather than a medium that propagates or transmits program code 1118. Computer readable storage media 1124 is also referred to as a computer readable tangible storage device or a computer readable physical storage device. In other words, computer readable storage media 1124 is a media that can be touched by a person.

Alternatively, program code 1118 may be transferred to data processing system 1100 using computer readable signal media 1126. Computer readable signal media 1126 may be, for example, a propagated data signal containing program code 1118. For example, computer readable signal media 1126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 1118 may be downloaded over a network to persistent storage 1108 from another device or data processing system through computer readable signal media 1126 for use within data processing system 1100. For instance, program code stored in a computer readable storage medium in a server data processing system may be downloaded over a network from the server to data processing system 1100. The data processing system providing program code 1118 may be a server computer, a client computer, or some other device capable of storing and transmitting program code 1118.

The different components illustrated for data processing system 1100 are not meant to provide architectural limitations to the manner in which different embodiments may be implemented. The different advantageous embodiments may be implemented in a data processing system including components in addition to or in place of those illustrated for data processing system 1100. Other components shown in FIG. 11 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1104 may take the form of a hardware unit that has circuits that are manufactured or configured for a particular use. This type of hardware may perform operations without needing program code to be loaded into a memory from a storage device to be configured to perform the operations.

For example, when processor unit 1104 takes the form of a hardware unit, processor unit 1104 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 1118 may be omitted, because the processes for the different embodiments are implemented in a hardware unit.

In still another illustrative example, processor unit 1104 may be implemented using a combination of processors found in computers and hardware units. Processor unit 1104 may have a number of hardware units and a number of processors that are configured to run program code 1118. With this depicted example, some of the processes may be implemented in the number of hardware units, while other processes may be implemented in the number of processors.

In another example, a bus system may be used to implement communications fabric 1102 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of more devices that transmit data, receive data, or transmit and receive data. A communications unit may be, for example, a modem or a network adapter, two network adapters, or some combination thereof. Further, a memory may be, for example, memory 1106, or a cache, such as found in an interface and memory controller hub that may be present in communications fabric 1102.

Thus, the different advantageous embodiments provide a method and apparatus for managing information about vehicles. In particular, the different advantageous embodiments may be used to reduce the amount of information that an operator of a vehicle needs to review. The reduction in the amount of information may be made by displaying items of interest without other items in the vehicle information. In other examples, graphical indicators may be used to bring an operator's attention to items that have been identified as items of interest. With one or more of the different advantageous embodiments, the amount of concentration and effort needed to review information to operate a vehicle may be reduced.

The different advantageous embodiments can take the form of an entirely hardware embodiment, an entirely software embodiment, or an embodiment containing both hardware and software elements. Some embodiments are implemented in software, which includes, but is not limited to, forms, such as, for example, firmware, resident software, and microcode.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for managing vehicle information, the method comprising:

displaying the vehicle information as an item on a display system for a vehicle, such that the vehicle information is for operating the vehicle, and displaying the item with an icon for receiving a user input selecting the item as belonging to a group of items of interest;

forming an item of interest by placing the item into the group of items of interest within an information management module in a computer system in response to receiving the user input selecting the icon with the item;

associating the item, and a location on a map for the item, with the group of items of interest;

changing a display of the icon, responsive to receiving at the icon the user input selecting the item into the group of items of interest, creating a changed icon;

displaying a number of items, each of the number of items being displayed in association with a number of graphical indicators on the display system, the number of graphical indicators comprising the changed icon identifying the number of items as being from the group of items of interest; and displaying in a second area on the display system, in response to receiving a selection of a graphical indicator in the number of graphical indicators, a portion of the map containing the location.

2. The method of claim 1, wherein the vehicle information is displayed in a first area of a display device in the display system, and further comprising:

displaying the map in the second area of the display device, the map configured for use in operating the vehicle and comprising at least one of: an indication of a current location of the vehicle; and an orientation of the vehicle in a location on the map corresponding to the current location.

3. The method of claim 1, such that forming the item of interest comprises:

associating context information with the item to be placed in the group of items of interest for the vehicle information in response to the user input selecting the item in the vehicle information as the item of interest; and placing the item having the context information associated with the item in the group of items of interest.

4. The method of claim 3, wherein the context information comprises at least one of a period of time for the item, a phase of operation for the vehicle for the item, and the location on the map for the item.

5. The method of claim 1, further comprising:

the portion being displayed in a more prominent fashion than before receiving the selection of the graphical indicator.

6. The method of claim 5, wherein the graphical indicator indicates that the location on the map is present for the item of interest.

7. The method of claim 1, wherein the user input is a first user input and further comprising:

displaying only the group of items of interest in an area of the display system in response to receiving a second user input.

8. The method of claim 1, wherein the step of displaying the vehicle information as the item on the display system comprises:

displaying the vehicle information in an area on the display system for the vehicle; and wherein the step of displaying the number of items comprises:

displaying each of the number of items in the group of items of interest in association with the number of graphical indicators on the display system in the area, wherein the number of graphical indicators comprises the changed icon.

9. The method of claim 1, wherein the vehicle information comprises at least one of a route, weather information, a notice to airmen, a radio frequency, and a waypoint.

10. A method for managing flight information for an aircraft, the method comprising:

displaying the flight information for the aircraft as an item in a first area on a display system for the aircraft with an icon for receiving a user input selecting the item into a group of items of interest within an information management module;

displaying a map in a second area on the display system, the map comprising at least one of: an indication of a current location of the aircraft; and an orientation of the aircraft in a location on the map corresponding to the current location;

forming an item of interest by placing the item into the group of items of interest in response to receiving at the icon the user input selecting the item, and thereby associating the item, and a location on the map for the item, with the group of items of interest;

displaying in the second area of the display system, in response to receiving a selection of a graphical indicator in a number of graphical indicators, a portion of the map containing the location;

changing a display of the icon, responsive to receiving at the icon the user input selecting the item into the group of items of interest, creating a changed icon;

displaying, in the first area, a number of items from the group of items of interest; and displaying, in the first area, in association with each of the number of items the number of graphical indicators, the number of graphical indicators comprising the changed icon.

11. The method of claim 10, further comprising displaying a number of other items, the number of other items each lacking a corresponding graphical indicator, in the first area, in which the number of other items is not in the group of items of interest.

12. The method of claim 10, wherein the step of displaying the number of items comprises:

displaying only the number of items in the group of items of interest in association with the number of graphical indicators in the first.

13. The method of claim 10, such that forming the item of interest comprises:

associating context information with the item to be placed in the group of items of interest in response to the user input selecting the item in the flight information as the item of interest; and placing the item having the context information associated with the item in the group of items of interest.

14. The method of claim 13, wherein the context information comprises at least one of a period of time for the item, a phase of flight for the item, and the location on the map for the item.

15. The method of claim 10, wherein the flight information comprises at least one of a route, weather information, a notice to airmen, a radio frequency, and a waypoint.

16. An apparatus comprising:

a display system for a vehicle; and an information management module in communication with the display system, wherein the information management module is configured to:

display vehicle information in a first area on the display system as an item, wherein the vehicle information is for operating the vehicle;

place the item in the vehicle information into a group of items of interest within the information management module in response to receiving a user input, at an icon displayed with the item, selecting the item from the vehicle information as an item of interest;

associate the item, and a location on a map for the item, with the group of items of interest;

display, in a second area of the display system, in response to receiving a selection of a graphical indicator in a number of graphical indicators, a portion of the map containing the location; and display a number of items in association with the number of graphical indicators comprising a changed display of the icon, such that the changed display of the icon identifies the number of items as being from the group of items of interest.

17. The apparatus of claim 16, wherein in being configured to display the vehicle information on the display system, the information management module is configured to display the vehicle information in the first area of a display device in the display system and display the map in the second area of the display device, wherein the map is configured for use in operating the vehicle.

18. The apparatus of claim 16, wherein in being configured to place the item in the vehicle information in the group of items of interest in response to receiving the user input selecting the item from the vehicle information as the item of interest, the information management module is configured to associate context information with the item in response to the user input selecting the item in the vehicle information as the item of interest; and place the item having the context information associated with the item in the group of items of interest.

19. The apparatus of claim 18, wherein the context information comprises at least one of a period of time for the item, a phase of operation for the vehicle for the item, and the location on the map for the item.

20. The apparatus of claim 16, wherein the user input is a first user input and wherein in being configured to place the item in the vehicle information in the group of items of interest in response to receiving the first user input selecting the item from the vehicle information as the item of interest, the information management module is configured to associate the item with the group of items of interest for the vehicle information in response to the first user input selecting the item in the vehicle information as the item of interest in which the item is associated with the location on the map for the item; and display the map with the location on the display system in response to a second user input.

21. The apparatus of claim 16, wherein the user input is a first user input and wherein the information management module is further configured to display the number of items, from the group of items of interest, in an area of the display system without items of the vehicle information that are unselected as items of interest in response to receiving a second user input.

22. A method for managing flight information, the method comprising:

displaying in a first area on a display, a number of graphical indicators in association with a number of items of flight information on a display device, the number of items of flight information being associated with a number of locations on a map, the map comprising at least one of: an indication of a current location of an aircraft; and an orientation of the aircraft in a location on the map corresponding to the current location; and responsive to receiving a user input selecting a graphical indicator in the number of graphical indicators, displaying, in a second area on the display, at least a portion of the map, with a location in the number of locations displayed in a more prominent fashion than before receiving the user input, on the display device, in which the location is associated with the graphical indicator.

23. The method of claim 22, wherein the user input is a first user input and the graphical indicator is a first graphical indicator displayed in association with an item and further comprising:

responsive to receiving a second user input selecting a second graphical indicator in the number of graphical indicators, placing the item associated with the first graphical indicator and the second graphical indicator in a group of items of interest for the flight information, and changing a form of the second graphical indicator.

24. The method of claim 22, wherein the user input is a first user input and the graphical indicator is a first graphical indicator displayed in association with an item, and further comprising:

responsive to receiving a second user input selecting a second graphical indicator in the number of graphical indicators, removing the item associated with the first graphical indicator and the second graphical indicator from a group of items of interest for the flight information, and changing a form of the second graphical indicator.

* * * * *